(12) United States Patent
Seegers et al.

(10) Patent No.: US 11,772,576 B2
(45) Date of Patent: Oct. 3, 2023

(54) INTERIOR TRIM PART FOR A MOTOR VEHICLE AND METHOD OF ITS MANUFACTURE

(71) Applicant: International Automotive Components Group GmbH, Duesseldorf (DE)

(72) Inventors: Huib Seegers, Eindhoven (NL); Henk Rijpkema, Baarlo (NL); Carter Scott Cannon, Munich (DE)

(73) Assignee: International Automotive Components Group GmbH, Düsseldorf (DE)

( * ) Notice: Subject to any disclaimer, the term of this patent is extended or adjusted under 35 U.S.C. 154(b) by 96 days.

(21) Appl. No.: 17/226,691

(22) Filed: Apr. 9, 2021

(65) Prior Publication Data

US 2021/0300266 A1    Sep. 30, 2021

Related U.S. Application Data

(63) Continuation of application No. 15/665,588, filed on Aug. 1, 2017, now Pat. No. 10,974,662.

(30) Foreign Application Priority Data

Aug. 2, 2016   (DE) .................... 10 2016 114 272.7

(51) Int. Cl.
  *B60R 13/02*   (2006.01)
  *B60Q 3/80*    (2017.01)
  (Continued)

(52) U.S. Cl.
  CPC .............. *B60R 13/02* (2013.01); *B60K 35/00* (2013.01); *B60K 37/06* (2013.01); *B60Q 3/14* (2017.02);
  (Continued)

(58) Field of Classification Search
  CPC ................ B60R 13/02; B60R 11/0235; B60R 2013/0287; B60K 35/00; B60K 37/06;
  (Continued)

(56) References Cited

U.S. PATENT DOCUMENTS 8,377,347 B2   2/2013   Sostmann et al.
8,449,156 B2   5/2013   Salter et al.
(Continued)

FOREIGN PATENT DOCUMENTS

AT   006 269 U1    7/2003
DE   103 52 044 A1  6/2005
(Continued)

OTHER PUBLICATIONS

European extended search report dated Nov. 3, 2017, for related European Application No. 17182361.0 (8 pgs).
(Continued)

*Primary Examiner* — Joseph D. Pape
*Assistant Examiner* — Dana D Ivey
(74) *Attorney, Agent, or Firm* — Grossman, Tucker, Perreault & Pfleger, PLLC; Steven J. Grossman

(57) ABSTRACT

The disclosure relates to an interior trim part for a motor vehicle, which comprises: a support component and a cover layer on a visible side of the support component, wherein the support component has an opening which is covered by the cover layer, and an insert, which is received in the opening and has a top side which is covered by the cover layer, wherein the insert receives an electrical function module or is coupled to the same, which function module is equipped in order to emit and/or receive light and/or signals through the surface of the insert and the cover layer.

16 Claims, 15 Drawing Sheets

(51) Int. Cl.
*B60Q 3/14* (2017.01)
*B60K 35/00* (2006.01)
*B60K 37/06* (2006.01)
*B60Q 3/54* (2017.01)
*B60Q 3/74* (2017.01)
*B60R 11/02* (2006.01)

(52) U.S. Cl.
CPC .............. *B60Q 3/54* (2017.02); *B60Q 3/745* (2017.02); *B60Q 3/80* (2017.02); *B60R 11/0235* (2013.01); *B60K 2370/1438* (2019.05); *B60K 2370/152* (2019.05); *B60K 2370/27* (2019.05); *B60K 2370/28* (2019.05); *B60K 2370/339* (2019.05); *B60R 2013/0287* (2013.01)

(58) Field of Classification Search
CPC ...... B60K 2370/1438; B60K 2370/152; B60K 2370/27; B60K 2370/28; B60K 2370/339; B60Q 3/14; B60Q 3/54; B60Q 3/745; B60Q 3/80
USPC ......................................................... 296/1.08
See application file for complete search history.

(56) References Cited

U.S. PATENT DOCUMENTS

| 8,506,141 | B2 | 8/2013 | Cannon et al. |
| 8,915,001 | B2 | 12/2014 | Breunig et al. |
| 10,974,662 | B2* | 4/2021 | Seegers .................... B60Q 3/80 |
| 2002/0101738 | A1 | 8/2002 | Misaras |
| 2014/0211498 | A1 | 7/2014 | Cannon et al. |
| 2017/0361782 | A1* | 12/2017 | Musy ................. B23K 35/0244 |

FOREIGN PATENT DOCUMENTS

| DE | 10 2008 045 015 A1 | 3/2010 |
| DE | 102009004985 A1 | 7/2010 |
| DE | 10 2010 039 270 A1 | 2/2011 |
| DE | 10 2011 005 268 A1 | 9/2011 |
| DE | 10 2014 006 567 A1 | 11/2015 |
| EP | 1249369 A1 | 10/2002 |
| EP | 2 415 639 A1 | 2/2012 |
| EP | 2 762 362 A1 | 8/2014 |
| FR | 2 937 929 A1 | 5/2010 |
| WO | 2010 118795 A1 | 10/2010 |

OTHER PUBLICATIONS

Notice of Third Party Observation dated Aug. 9, 2018 in related European Application No. 17182361.0 (4 pgs).

Updated European search report, dated Nov. 5, 2018, for related European Application No. 17182361.0 (4 pgs).

Third Party Observation dated Feb. 18, 2019 in related European Application No. 17182361.0 (5 pgs).

* cited by examiner

INTERIOR TRIM PART FOR A MOTOR VEHICLE AND METHOD OF ITS MANUFACTURE

CROSS REFERENCE TO RELATED APPLICATIONS

The present application is a continuation application of U.S. non-provisional patent application Ser. No. 15/665,588 filed Aug. 1, 2017, now pending, which claims priority to German patent application serial no. 10 2016 114 272.7, filed Aug. 2, 2016, the entire disclosure of which is incorporated herein by reference.

FIELD

The invention relates to an interior trim part for a motor vehicle and to a method for its manufacture.

BACKGROUND

In the interior of motor vehicles, interior trim parts are employed which assume a multiplicity of tasks such as the sound insulation, providing a support for numerous display and function units, improving the aesthetic appearance and the like. Furthermore, a multiplicity of illumination and display units are found in the interior of a motor vehicle, which generally serve for either room illumination or background illumination, which illuminate individual objects for aesthetic reasons or for orientation, which indicate function states of the motor vehicle, serve as information or warning signal and much more. Increasingly, illumination and display units are found which are integrated in the interior trim.

DE 10 2008 045 015 A1 describes an interior trim part with electroluminescent elements, which are embedded flat in a moulded plastic skin of an instrument panel. The outermost layer of the electroluminescent element is produced from the same plastic material as the moulded skin.

EP 2 415 639 A1 describes an interior trim part for a motor vehicle with integrated illumination. A recess is formed into the front of a support which receives a flat illumination unit. The connection for the illumination unit is routed through an opening in the base of the recess to the back of the support. A cover layer is applied over the illumination unit onto the support, the cover layer being translucent.

EP 2 762 362 A1 describes an illuminated interior trim part for a motor vehicle with a light-emitting layer on the back of a support, wherein the support and its cover layer are translucent.

DE 10 2014 006 567 B4 describes an interior trim part with a back-lit component having a transparent diffusor element, a transparent cover layer on the diffusor element and a light source on the back of the diffusor element, the component sitting in or on a support layer and protruding from the same.

With the exception of the last mentioned publication, the illumination systems described above work according to a so-called "hidden until lit" technology. They can be configured so that they are not perceptible to the occupants of the motor vehicle while the associated light source is not switched on. In the switched-off state, the illumination device is concealed behind or in the interior trim part, it is preferably not perceptible, not even haptically, so that the interior trim part has an inconspicuous continuous appearance. The illumination device can serve both as background illumination and also for illuminating decorative elements and as orientation light. The known systems are limited to emitting light.

SUMMARY

This disclosure provides an interior trim part for a motor vehicle which comprises a support component and a cover layer on a visible side of the support component, wherein the support component has an opening which is covered by the cover layer. An insert is received in the opening and has a top side that is covered by the cover layer, wherein the inserts receives an electrical function module or is coupled to the same. The electrical function modules is equipped in order to emit and/or receive light and/or signals through the surface of the insert and the cover layer. The electrical function module can for example comprise an illumination unit, a display or a sensor/control unit or a combination of these elements. In a preferred configuration, the cover layer comprises a decorative layer with a foam layer on its back.

This disclosure provides a structure for an interior trim part which can be integrated in an electrical function module, which can be more than an illumination. The function module can be inserted into the opening from the back of the support component and is therefore easily accessible for assembly and maintenance. The function module cannot only receive a light source but also more complex units such as a control device, a sensor, a switch, a transmitter, a receiver, a display or the like and also combinations of these units. On the front of the interior trim part the function module is concealed by the cover layer, which covers the opening.

The described structure is suitable also for such interior trim parts which have a cover layer including a decorative layer and a foam layer because the opening, which is formed in the support component, can continue as far as into the foam layer. Here, the interior trim part can be configured so that the function module is covered by the decorative layer, wherein between the insert and the decorative layer no part of the foam layer of the cover layer is located. This is practical when the function module comprises for example a display or a transmitter/receiver unit which is intended to transmit light and/or signals largely unhindered through the translucent decorative layer. If a foam layer were to be additionally present under the decorative layer, the same could potentially visually distort a display or distort a sensor signal.

In various examples, the cover layer is transparent, semi-transparent or translucent at least in the region of the opening in the support component. Transparency and semi-transparency together are referred to as transparency in the following. Provided that a foam layer that may be present in the region of the opening is recessed it is sufficient when the associated decorative layer is transparent or translucent. In these configurations, the insert is also transparent or translucent or it has a transparent or translucent cover. On the top side of the insert, a transparent or translucent further foam layer can be formed. In the context of this application, the characteristic "transparent" describes the optical characteristic of a material which transmits visible light largely without distortion at 100% or almost 100%, for example down to 70%. The visible light is hardly absorbed or reflected, not diffused and not distorted by a transparent material. Examples for transparent material are transparent plastics, for example transparent MMA, PC, PU, UV-stabilised ABS, PP or other transparent polymers and silicones, and glass. A "translucent" material has a certain light permeability such as for example in the case of milk glass, but the light can be at least partly diffused or absorbed through the material characteristics so that colours, bright and dark areas are perceptible but not all details of a display for example. "Semi-transparency" is a reduced light permeability for example in the range from 10% to 70%, which however is not accompanied by a diffusion or distortion of the light.

It is also possible that the cover layer and if appropriate the insert or the cover of the function module are opaque, namely in particular when the function module does not have any display or illumination function but for example serves as sensor or control device. If appropriate, the position of the sensor can also be indicated to the occupants of the motor vehicle in a manner other than illumination, for example by a suitable marking or colouring on the top of the interior trim part and/or by a perceptible change in shape of the surface.

This disclosure proposes various methods for manufacturing the interior trim part: in an example, the support component and the decorative layer are introduced into a mould wherein between the support component and decorative layer a hollow space remains. Following this, a foam layer is formed in the hollow space in the mould between the support component and the decorative layer. Once the foam layer has been formed, the opening can be formed in the support component and a section of the foam layer is removed in the region of the opening in order to form a receiving space for the insert. Then, the insert is introduced into the receiving space so that the top side of the insert is adjacent the back side of the decorative layer. Here, the insert, which is introduced into the opening, can have a cover plate and a transparent or translucent additional foam layer, wherein the additional foam layer can come to lie between the cover plate and the back side of the decorative layer. A transparent silicone foam layer can also be provided as a separate layer or integrated in the insert.

Before forming the foam layer, a non-stick film can be applied to the back side of the decorative layer in the region of the opening so that the section of the foam layer can be detached and removed without residue or substantially without residue from the decorative layer. Furthermore, a perforation can be formed in the support component prior to the forming of the foam layer, which delimits the opening and which facilitates removing the support component material in the region of the opening. This perforation can be sealed during the production of the foam layer if appropriate, so that the foam does not leak out to the back of the support component. The process sequence is simple and readily controllable. It utilises existing production processes. Through this procedure it can be ensured that, when filling the hollow space, no residual foam remains between the insert and the decorative layer. It is possible to use the same tool for different configurations. In an alternative process sequence, the insert is introduced into the opening in the support component before the forming of the foam layer and the support component introduced into a mould together with the insert and the decorative layer in order to form the foam layer between the support component and the insert and the decorative layer in the mould. Here, the insert, which is introduced into the mould, can have a cover plate and a transparent or translucent additional foam layer, wherein the additional foam layer comes to lie between the cover plate and the back side of the decorative layer. The foam layer of the cover layer, which is formed in the mould, should not penetrate between the insert and the decorative layer. This approach does not require any reworking steps following the joining of cover layer and support component but is slightly more demanding with respect to the tooling technology. By providing a preferentially thin further foam layer on the cover plate, an interior trim part is obtained, which gives a haptically soft impression even in the region of the insert. With this process sequence it can also be ensured that no residual foam remains when filling the hollow space between the insert and the decorative layer.

The cover plate moulded into the interior trim part can be coupled to the electrical function module on the back side of the interior trim part or to any other electronic control unit (ECU).

In a further example of the method, the cover layer is initially applied on the support component wherein the support component has the opening even before applying the cover layer or the opening in the support component is formed after the cover layer has been applied and the insert is subsequently inserted in the opening in the support component so that the top side of the insert adjoins a back side of the cover layer. In this example, the cover layer can comprise a decorative layer and a foam back layer.

SHORT DESCRIPTION OF DRAWINGS

In the following, the invention is explained by way of examples making reference to the figures.

DETAILED DESCRIPTION

Figure 1:
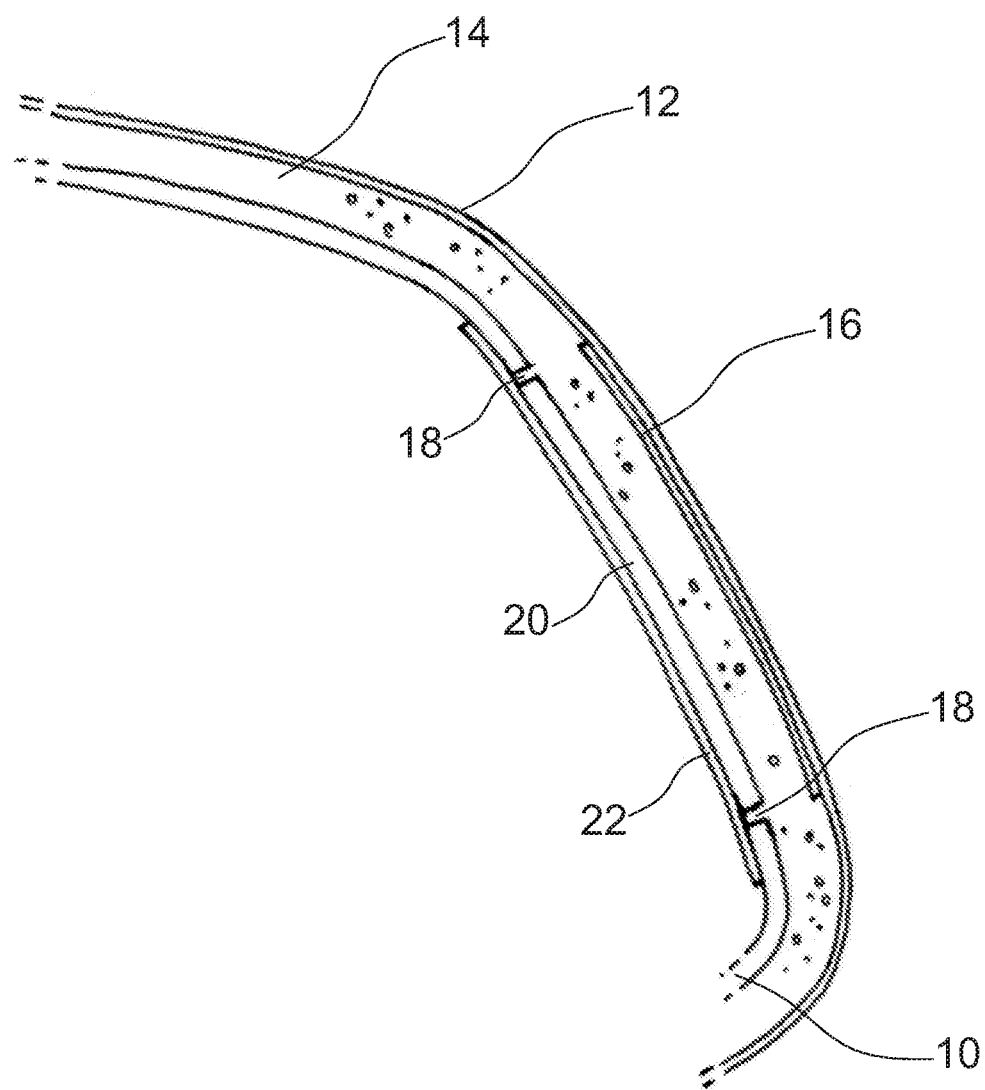
FIGS. 1 to 3 show different steps of a method for manufacturing an interior trim part according to an example.

FIG. 1 shows an intermediate stage of a method for manufacturing an interior trim part according to an example. In the shown method step, the interior trim part is already pre-processed. This intermediate stage is produced by introducing a support component 10 and a decorative layer 12 into a mould, wherein between the support component 10 and the decorative layer 12 a hollow space remains. This hollow space is then filled with a foamable material which is brought to react in order to form a foam layer 14. The decorative layer 12 and the foam layer 14 jointly form the cover layer of the interior trim part.

The support component 10 can consist of a plastic such as PP or ABS, a fibre composite material such as PP GF, including such that contain natural fibres or another suitable material. It can be preformed. The decorative layer 12 can likewise be produced from a plastic such as PU, PVC, TPU, TPE or TPO, of a textile, leather or artificial leather or a composite material such as is known in principal for interior trim parts. In the shown example, the decorative layer 12 is a slush skin. A slush skin is a plastic skin for example on PVC basis or urethane basis (TPU) or olefin (TPO) or polyester base (TPE), which is formed by melting plastic powder on a heated mould (nickel mould). The mentioned materials serve as examples and are not intended to imply any limitation to certain materials.

The preform shown in FIG. 1 furthermore comprises an optional non-stick layer 60 for example of a Teflon, silicone or PP-containing material between the foam layer 14 and the decorative layer 12, which is provided in a region of the interior trim, in which an electrical function module is to be provided. In the same region, the support component 10 has a perforation 18 which allows removing a part 20 of the support component in a following processing step. Instead of the perforation, another type of material weakening can also be provided in the support component 10 for example a cross-section reduction. During the foaming process, the perforation 18 is sealed by a cover layer 22 in order to prevent that foam leaks through the perforation 18 during the production of the foam layer 14. The perforation 18 can be introduced into the support component during the production of the support component 10, for example by forming the perforation during an injection moulding process, or by subsequent working of the support component.

The non-stick layer 16 can be formed by a film, a gel or a sprayed-on substance. It can, if it is transparent, remain in situ or be removed together with the cut-out part of the foam layer 14 (see FIG. 2).

The decorative material 12 and the optional non-stick film 16 can be transparent or translucent at least in sections, in particular in the region located opposite the part 20, as explained in the following.

Figure 2:
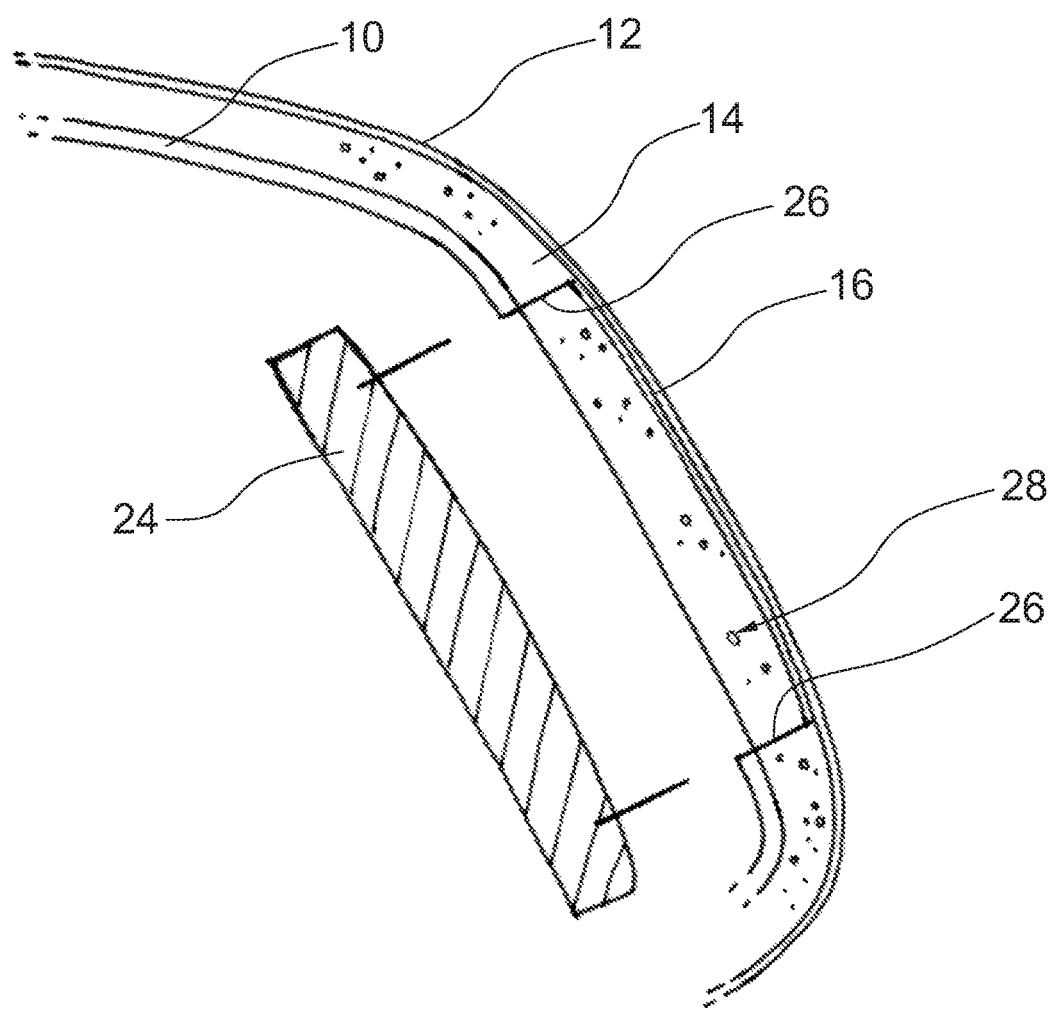

As shown in FIG. 2, the part 20 of the support component 10 can be removed with a cutting tool 24 along the perforation 18. For removing the part 20, a laser or a CNC cutting device can be used for example. The cutting tool 24 can comprise for example one or more fixed or rotating cutting blades. In the same region, the material of the foam layer 14 can also be partly or completely removed. This is indicated by the cut lines 26 in FIG. 2. During the complete removal, the non-stick film 16 assists an easy detaching of the foam layer section from the back of the decorative material 12. By removing the part 20 of the support component 10 and a corresponding section of the foam layer 14, a hollow space 28 is formed in the preform, in which a function module can be at least partly inserted. This is explained with reference to FIG. 3.

Figure 3:
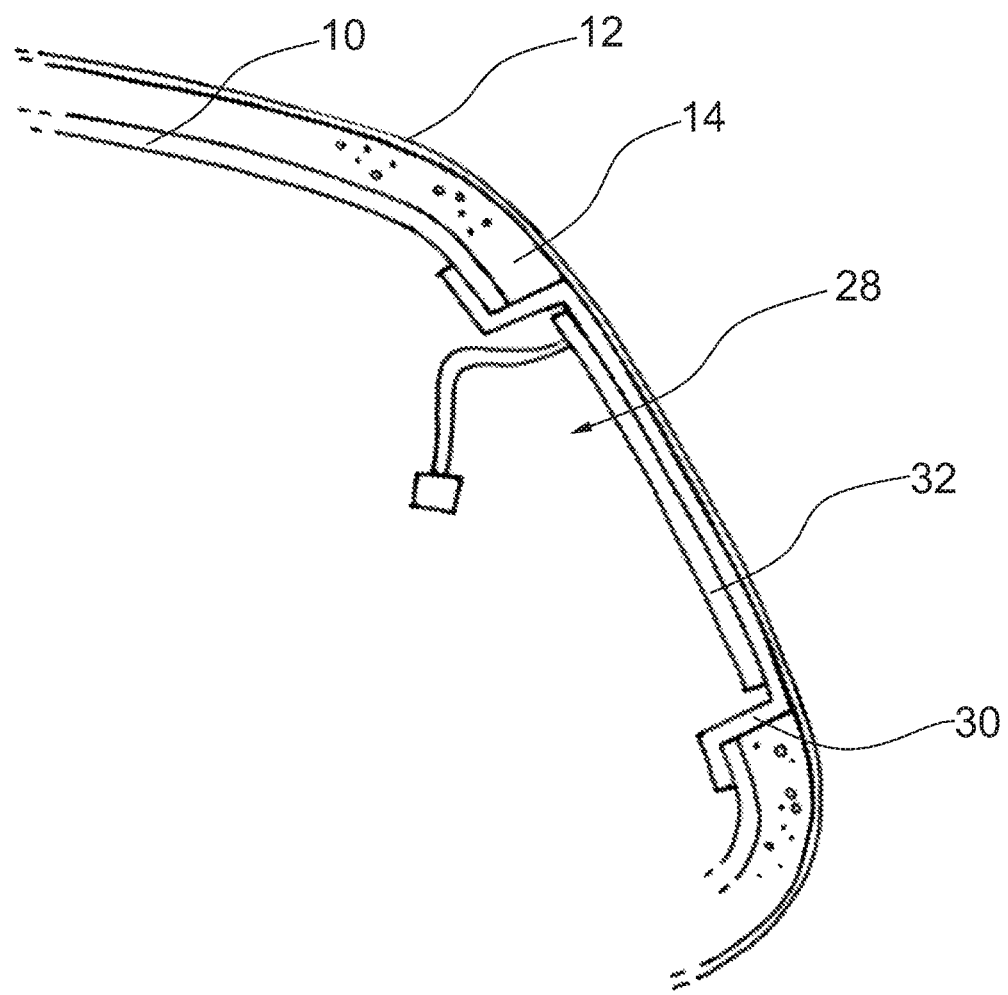

FIG. 3 shows the interior trim part with the hollow space 28 formed as described above, into which an insert 30 is introduced which receives a function module 32. The insert 30 has a transparent cover, for example consisting of transparent plastic, for example PMMA, PC, PU or silicone or of glass and, in the example, contains a function module 32, for example an illumination component, a display, a sensor/receiver unit, control electronics or a combination of these elements. Illumination units can comprise all types of light sources, including electroluminescence films and LEDs. Displays can for example comprise LED or LCD displays, segment displays, monitors, including touch screens, static and dynamic displays. The touch screen can also serve as sensor.

The function module 32 can for example have a proximity sensor and/or motion sensor, which when the hand of an occupant of the motor vehicle approaches, actuates a switch in order to, for example, switch on or dim a light or in order to operate another function unit such as a ventilation or air-conditioning system, an audio playback device, actuation device such as window lifter or side mirror adjustor. Here, the switch can be an on-off switch or cause a step-by-step or continuous adjustment. By approaching the proximity or motion sensor or by a kind of swiping motion over the sensor, not only function units can be switched on and off but more complex control functions can also be carried out. It is conceivable, for example, that when a sensor is arranged in a door interior trim, a window is closed by approaching the sensor and upward swiping and a window is opened by approaching the sensor and swiping downwards. A similar way of operating a sensor in an instrument panel can be utilised for example for controlling an audio playback device for selecting a radio station, setting the playback volume and the like. To this end, the sensor can comprise an array of sensor elements and associated control electronics.

The sensor itself can be illuminated or activate an illumination device when it detects an object approaching. Instead or in addition to a sensor, the function module can also comprise an illumination unit which is activated via an external or an integrated switch, wherein the integrated switch in turn can be activated by a proximity sensor.

As explained above, the decorative layer 12 and the optional non-stick film 16 in the region of the hollow space 18 can be transparent or translucent. When the combination of decorative layer 12 and the non-stick film 16 have a light permeability in the order of magnitude of approximately 70% to 100%, the insert 30 can be visually perceptible through the decorative layer 12, even if it is not illuminated, wherein the region above the insert 30, due to the production method, is not apparent on the surface of the interior trim part and is not haptically or not significantly haptically distinct from the remaining surface of the interior trim part. With a lower light permeability, for example in the order of magnitude of approximately 30% to 70%, the "hidden until lit" effect described above is obtained, according to which the insert and the function module are only visually perceptible through the decorative layer 12 when they emit light, i.e. for example an illumination unit or a display monitor are active. A light permeability of below 30% is called opacity, the decorative layer is then largely light-impermeable and the insert and the function unit are not visually perceptible. This configuration can be selected when the function unit does not comprise any illumination unit and no display monitor but serves for example as sensor and switching unit.

The function module 32 is accessible from the back of the insert 30 and the interior trim part. There it can be connected to supply and signal lines and maintained and replaced if required.

Figure 4A:
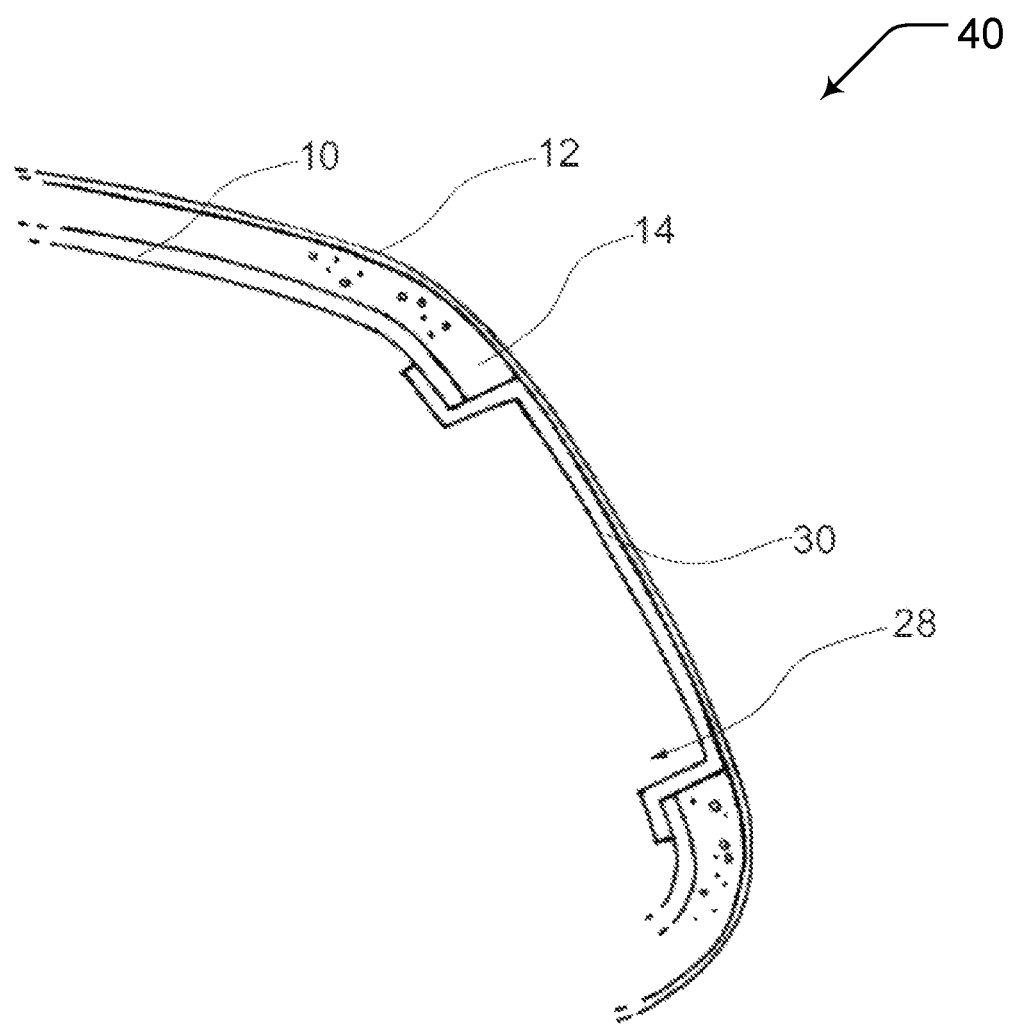
FIGS. 4A and 4B show alternative configurations of a support component that can be used in the production method.
Figure 4B:
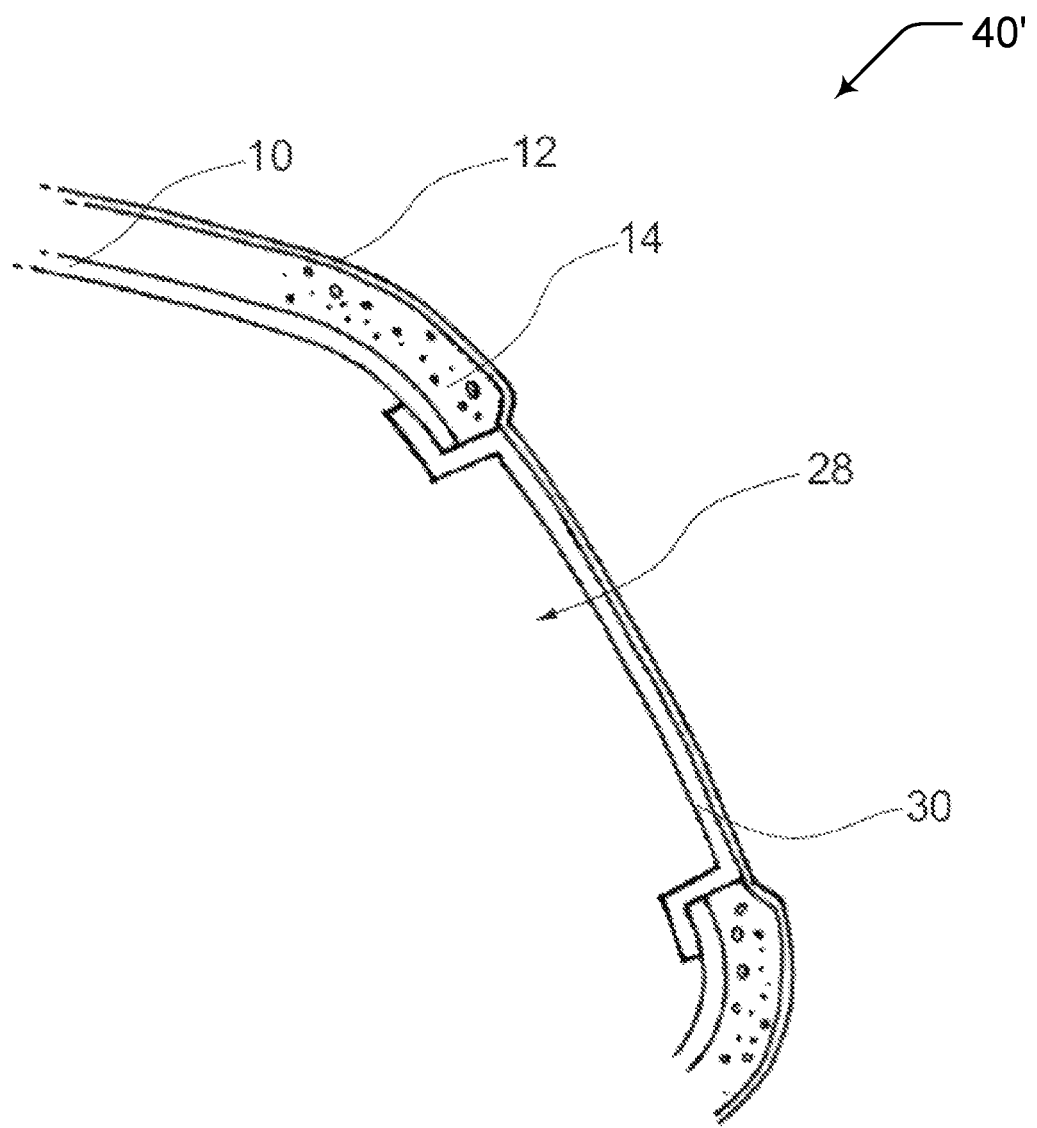

FIGS. 4A and 4B show alternative examples of interior trim parts 40, 40' which can be manufactured using the described manufacturing method. The interior trim part 40 largely corresponds to that shown in FIG. 3. The same reference numbers refer to corresponding parts. Reference is made to the description of FIGS. 1 to 3. The interior trim part 40 is designed so that the decorative layer 12 smoothly covers the hollow space 28 and the insert 30 located therein and that the insert 30 is not apparent through the decorative layer 12. Optionally, a thin foam layer can be applied to the outer surface of the insert 30 in order to create a similar haptic perception of the surface of the interior trim part also in the region of the insert 30 as on its remaining surface.

FIG. 4B shows a modification of the interior trim part 40', wherein the surface of the interior trim part is preformed in the region of the hollow space 28 and of the insert 30 so that the insert 30 or the function module (not shown in FIG. 4) contained therein can also be easily identified in the unlit state. To this end, the surface of the interior trim part 40' has a recess in the region of the insert 30. As for the rest, the interior trim part can be produced in the same or similar manner as described with reference to the FIGS. 1 to 3.

Figure 5A:
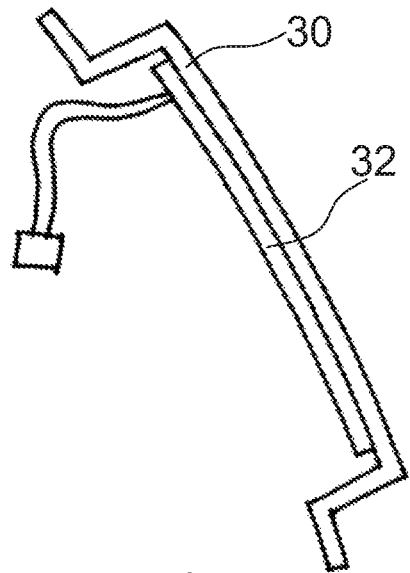
FIGS. 5A and 5C show alternative configurations of an insert that can be used in the production method.
Figure 5B:
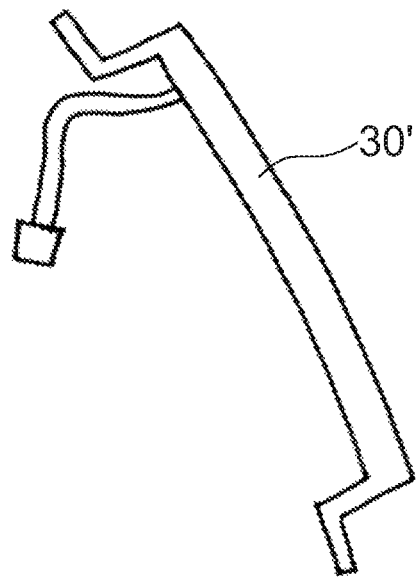
Figure 5C:
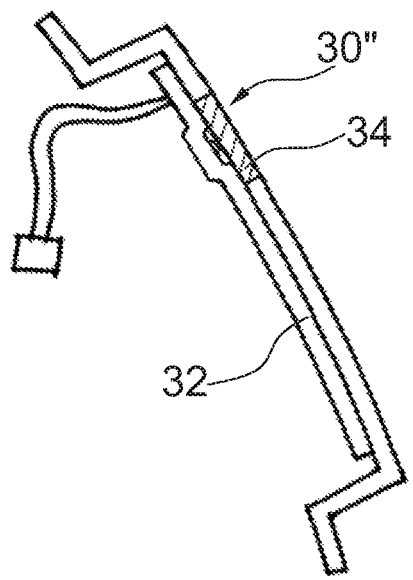

The FIGS. 5A and 5B show two examples of an insert that can be used in the described manufacturing method. The insert 30 including module 32 corresponds to the configuration of FIG. 3, to the description of which reference is made. FIG. 5B shows an alternative configuration of the insert 30', which is produced as a plastic body from a solid material and, for example, can serve as light conductor which is connected to an associated illumination unit. The illumination unit or another function unit can be coupled to the insert 30' or embedded in the same. FIG. 5C shows a possible use variant with a two-component structure of the insert, which utilises a local soft material 34, for example a plastic such as silicone, EPDM or rubber in the insert 30". Behind this soft material, a mechanical control unit for example a micro switch can be arranged which can be operated through the soft material 34. Accordingly, the function module 32 can be directly operated on the surface of the interior trim part.

Figure 6:
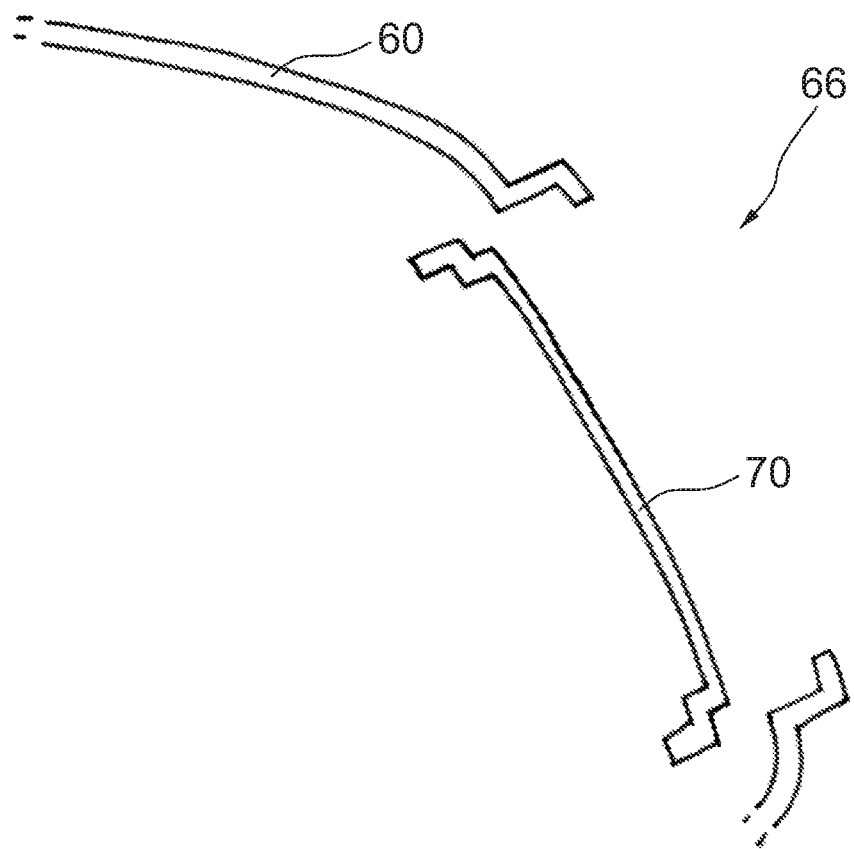
FIGS. 6 to 11 show different steps of a method for manufacturing an interior trim part according to a further example.
Figure 7:
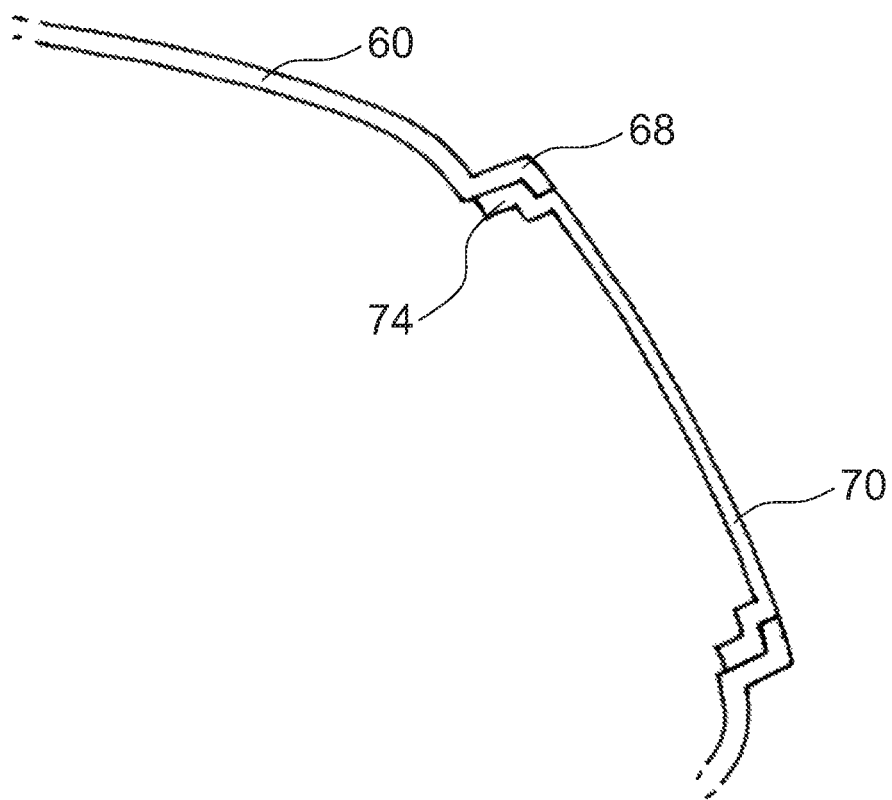
Figure 8:
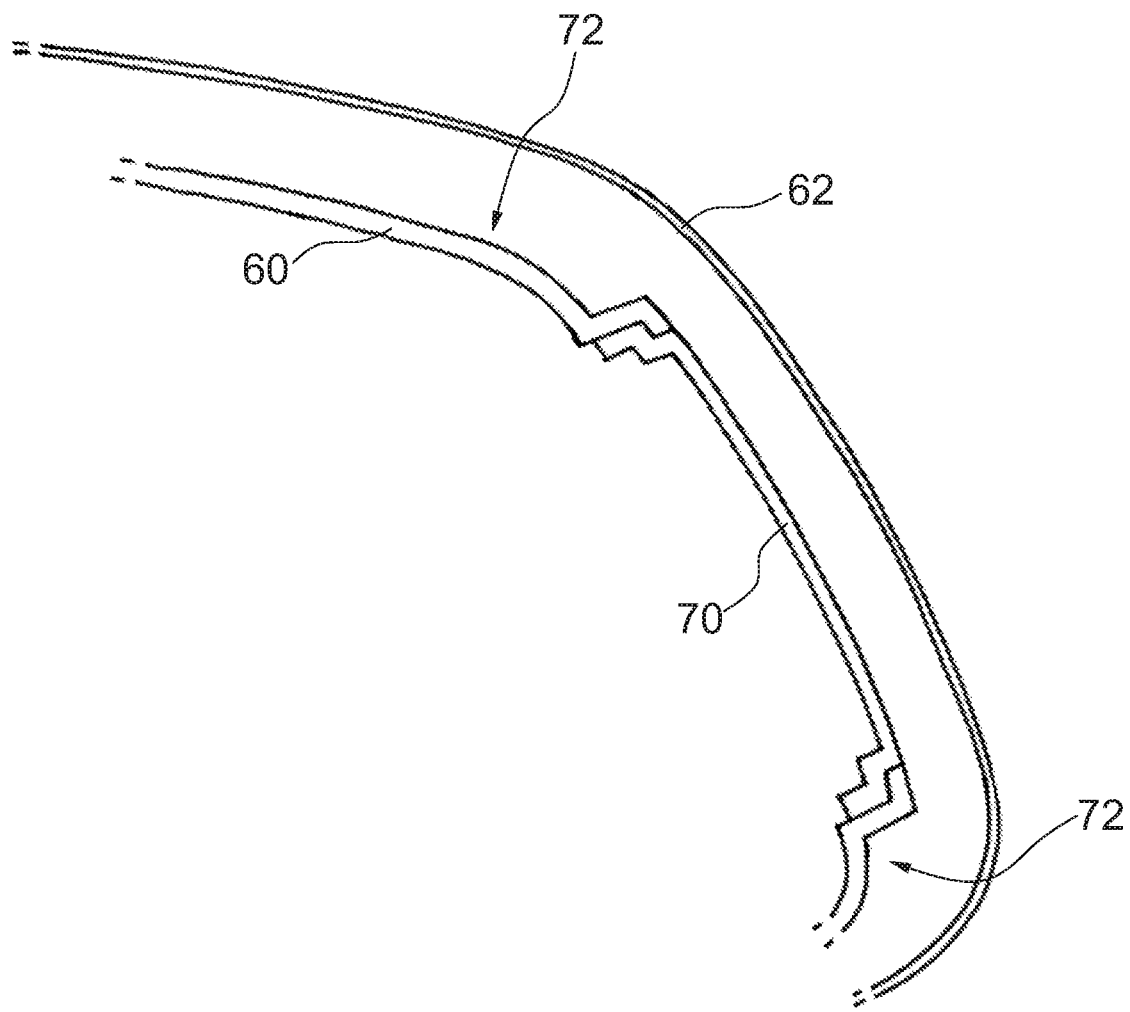
Figure 9:
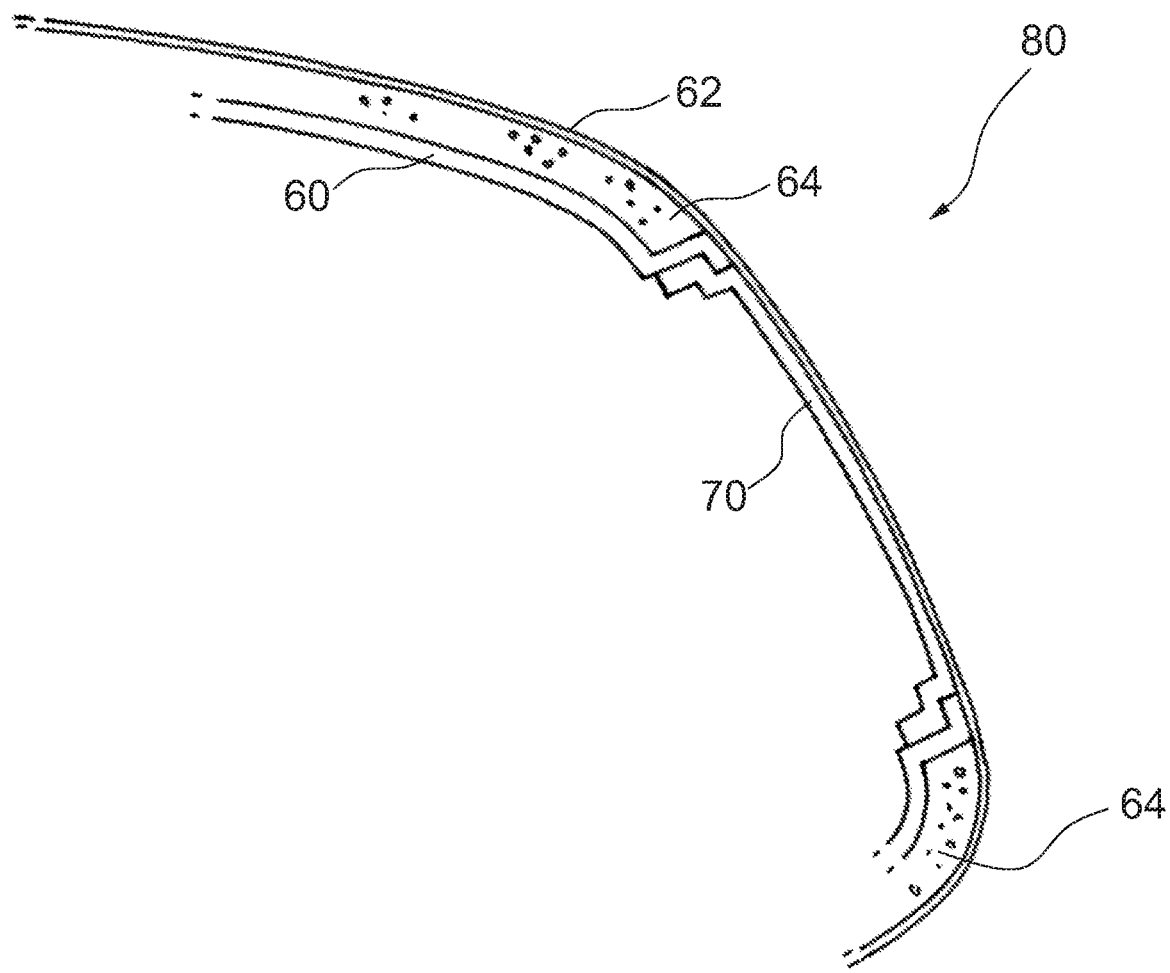

FIGS. 6 to 11 show various steps of an alternative manufacturing method according to a further example. FIG. 6 shows a support component 60, which has an opening 66, in which a transparent insert 70 is inserted which closes the opening 66 and forms a cover of the function module. The insert 70 can optionally have a transparent soft foam layer (not shown) on its top side, i.e. on the side which, in the finished interior trim part, faces the passenger compartment. FIG. 7 shows the support component 60 with the insert 70 introduced into the opening 66, which are connected via flange sections 68, 74. As indicated in FIG. 8, the same is introduced together with a decorative layer 62 into a mould, wherein the decorative layer 62 during the moulding comes to lie directly on the surface of the insert 70 or of the optional foam layer on the insert. A hollow space 72 remains between the support component 60 and the decorative layer 62 which is foamed in the tool in order to form a foam layer 64. Here, the process is controlled so that the material of the foam layer 64 cannot enter between the insert 70 and the decorative layer 62. This can be ensured through the optional foam layer 62 on the top side of the insert 70 and a suitable contact pressure between the insert 70 and the decorative layer 62 within the mould. FIG. 9 shows the interior trim part 80 removed from the mould.

Figure 10:
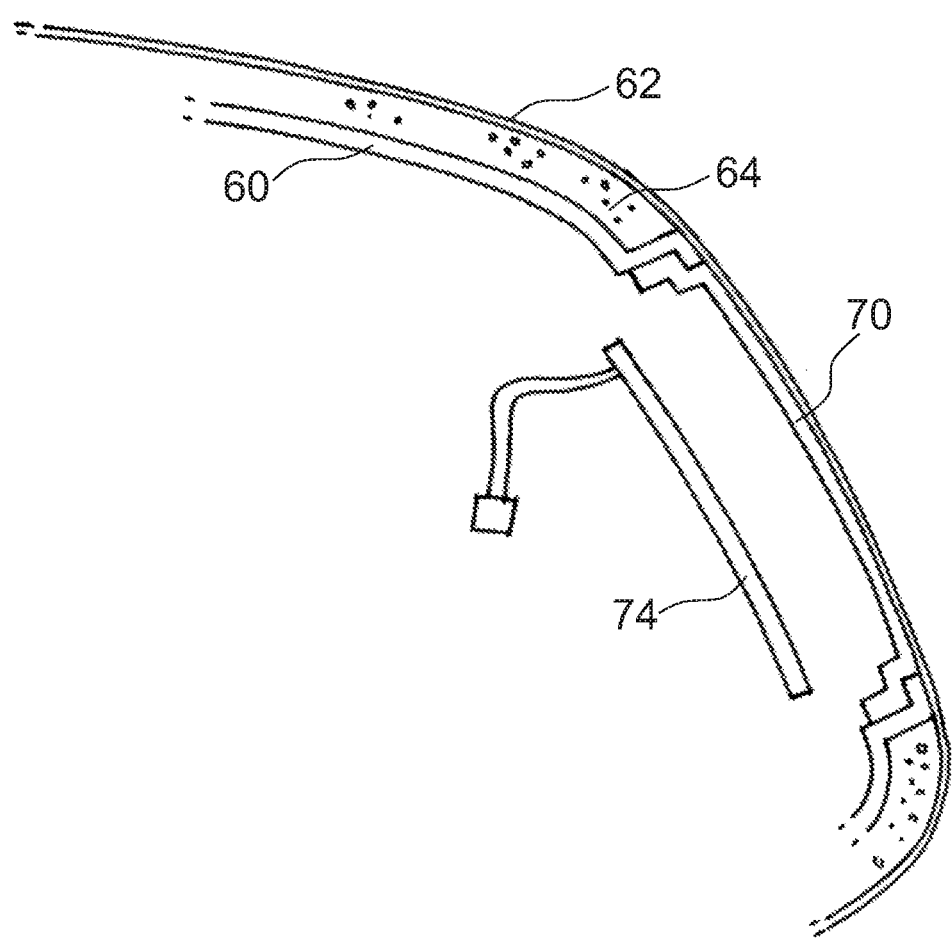
Figure 11:
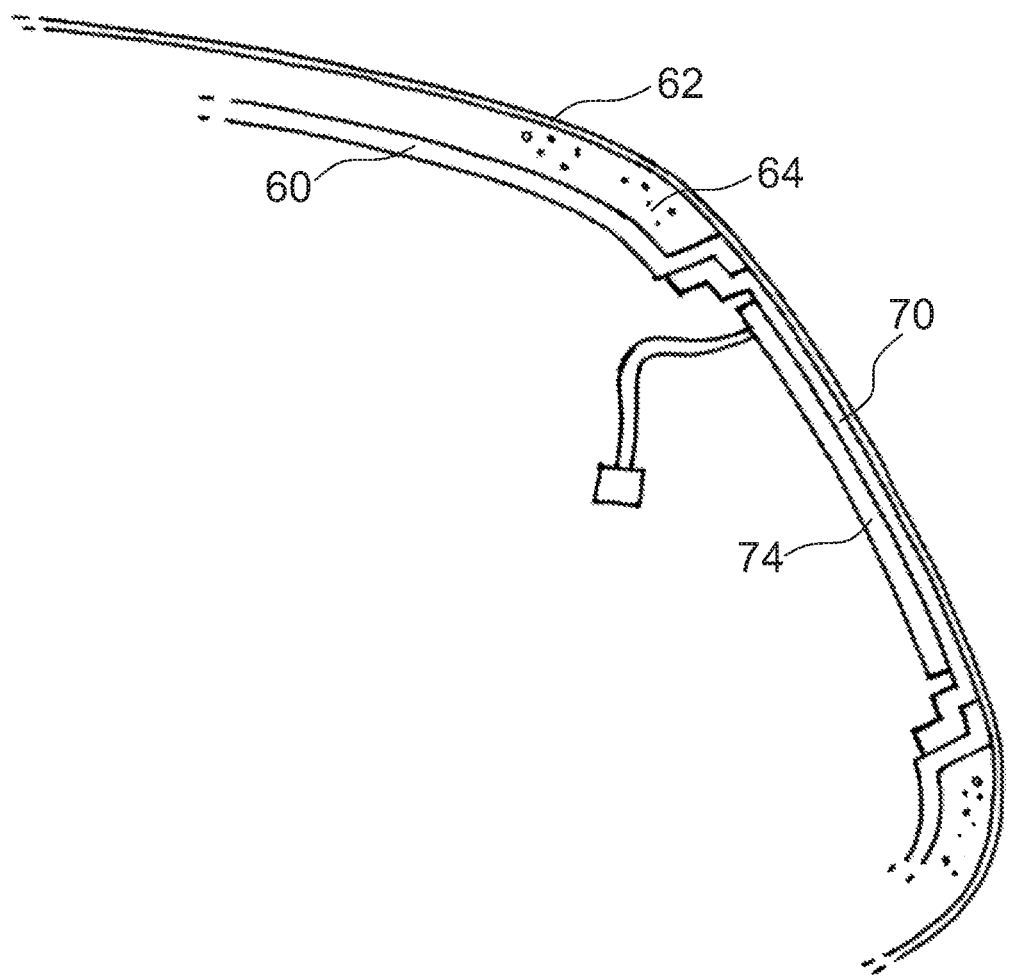

Following this, as shown in the FIGS. 10 and 11, a function module 74 is attached on the back of the insert 70 and connected to supply and control line. With respect to the materials and other characteristics of the support component 60, the decorative layer 62, the foam layer 64 and of the insert 70, as well as with reference to the functional scope of the function module 7, reference is made to the above description. What is expressed there also applies to the configuration of the FIGS. 6 to 11.

The manufacturing method of FIGS. 1 to 3 is suited for interior trim parts in which the insert 30 is relatively large and therefore, during the production of the foam layer 14, i.e. during the foaming process, forms a relatively large resistance to the spreading of the foam. An insert introduced into the support component 10 and protruding from the same would hinder the flow of the foam and could result in the foam layer not being formed with even thickness. Alternatively, in the case of smaller inserts 30, the insert could also be introduced into the support component 10 prior to the forming of the foam layer 14 and together with the same transferred into the mould in order to then form the foam layer between the support component 10 and the decorative layer 12. Here it should be ensured that the insert 30 is not damaged through the pressures and temperatures that occur during the foaming process and that no foam material enters the gap between the insert 30 and the decorative layer 12. The size from which an insert is considered as being small or large also depends on the other dimensions of the interior trim part, the thickness of the foam layer and further process parameters, such as the viscosity of the foam.

Figure 12:
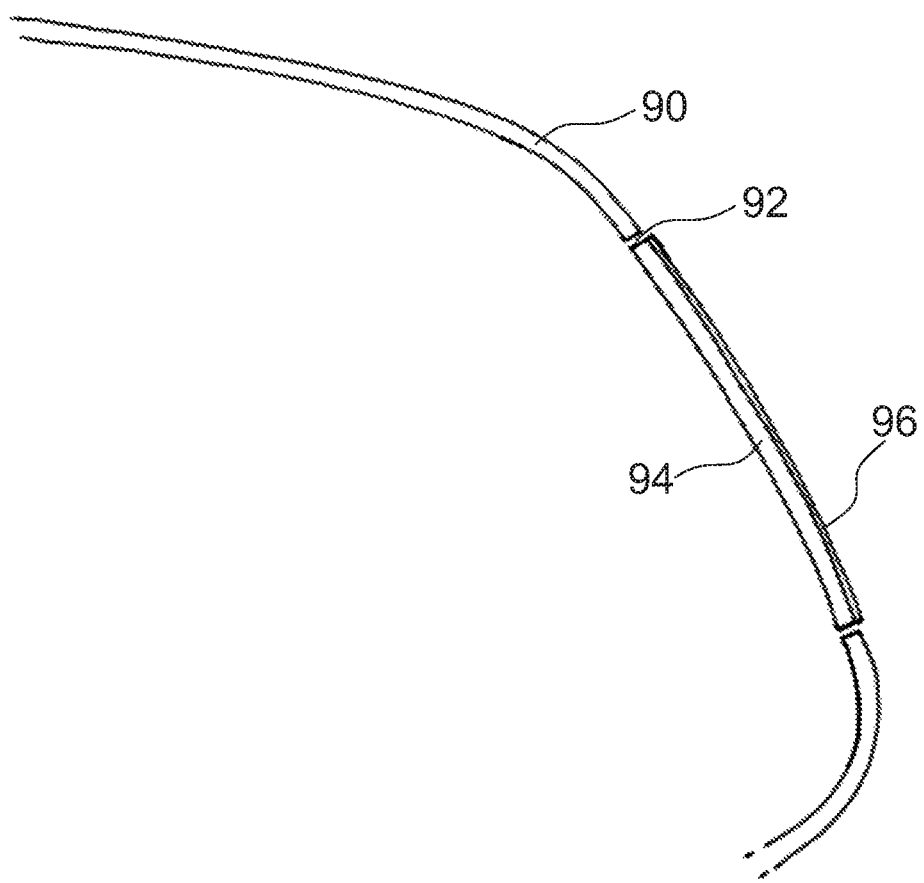
FIGS. 12 to 14 show different steps of a method for manufacturing an interior trim part according to yet another example.
Figure 13:
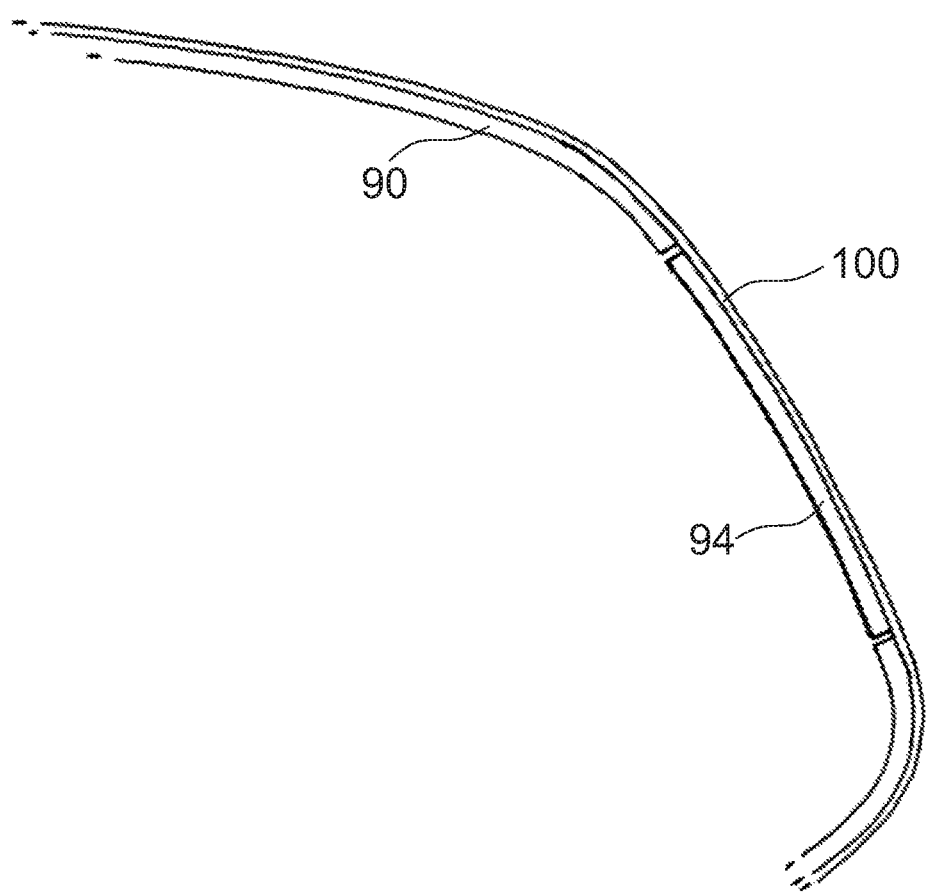
Figure 14:
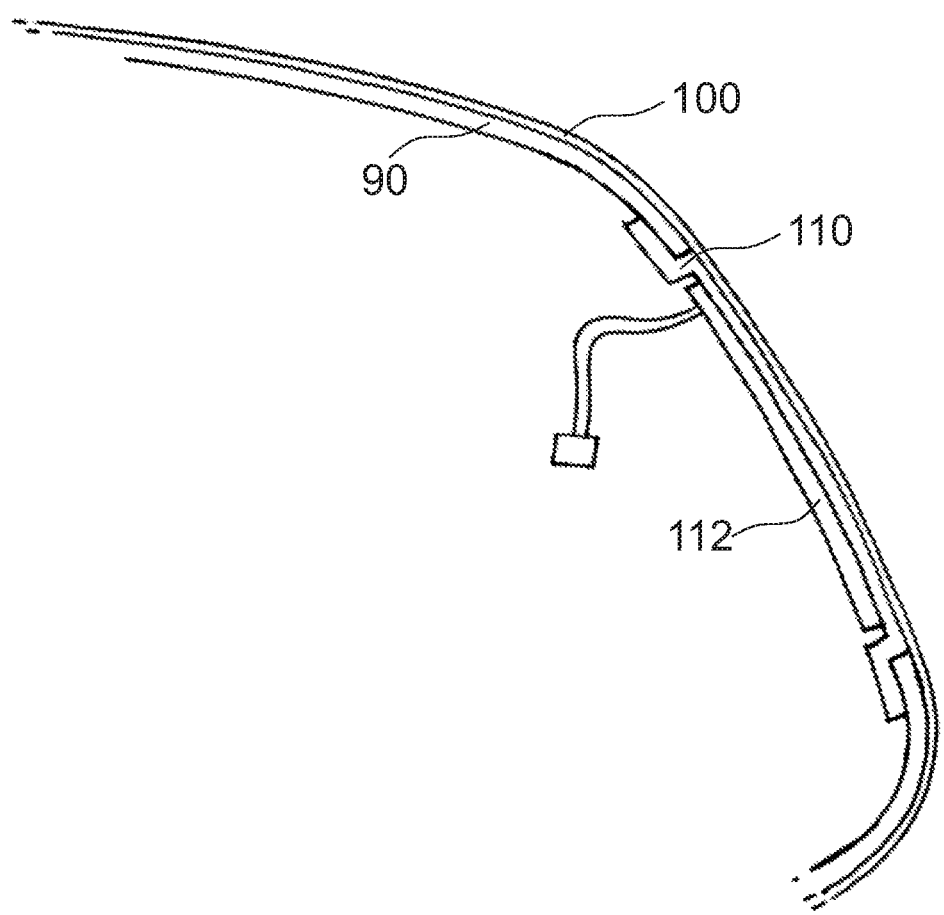

FIGS. 12 to 14 show various steps of a further example of a manufacturing method for the interior trim part. The method starts with the manufacturing of the support component 90, which has a perforation 92 for forming an opening. In the part 94 of the support component delimited by the perforation 92 a non-stick film 96 can be applied, see FIG. 12. On the support component 90, as shown in FIG. 13, a cover layer 100 is applied which can be single-layered or multi-layered. The cover layer 100 can be transparent, semi-transparent or translucent in the region of the part 94. With respect to the materials of the support component 90 and of the cover layer 100, reference is made to the above description wherein the cover layer 100, other than with the previously described examples, is not back-foamed onto the support component but can have a foam back layer.

The part 94 of the support component 90 delimited by the perforation 92 is detached and removed for example by cutting, as explained with reference to FIG. 2, in order to form a space for receiving an insert 110, as shown in FIG. 14. The insert 110 can receive a function module 112. With regard to the insert 110 and the function module 112, the same applies as explained above with reference to the other examples. Reference is made to the description of these other examples.

What is claimed is:

1. An interior trim part for a motor vehicle, comprising:
   a cover comprising a decorative layer;
   wherein the decorative layer is a plastic skin;
   a plastic body comprising a top side, a back side and a cover plate;
   wherein the top side of the plastic body at the cover plate underlies the plastic skin and is disposed adjacent the plastic skin;
   an electrical function module equipped to emit and receive light through the cover plate of the plastic body and the plastic skin;
   wherein the electrical function module comprises a proximity sensor and/or a motion sensor, which is activated by approaching the proximity sensor and/or the motion sensor, or which is activated by a swiping motion over the proximity sensor and/or the motion sensor;
   wherein the electrical function module including the proximity sensor and/or the motion sensor underlies the cover plate region of the plastic body and the electrical function module is disposed adjacent the back side of the plastic body; and
   wherein the plastic skin and the cover plate of the plastic body are light transmissive to light emitted from the electrical function module.

2. The interior trim part according to claim 1, wherein a foam surrounds the cover plate of the plastic body.

3. The interior trim part according to claim 2, wherein the cover plate of the plastic body is disposed in a recess in the foam.

4. The interior trim part according to claim 2, wherein the foam is not disposed between the plastic skin and the cover plate of the plastic body.

5. The interior trim part according to claim 1, wherein the plastic skin is formed of at least one of PVC, PU, TPU, TPE and TPO.

6. The interior trim part according to claim 1, wherein the plastic skin is at least one of transparent and semi-transparent to light emitted from the electrical function module.

7. The interior trim part according to claim 6, wherein the plastic skin is transparent to light emitted from the electrical function module.

8. The interior trim part according to claim 1, wherein the cover plate of the plastic body is formed of at least one of MMA, PC, PU, ABS and PP.

9. The interior trim part according to claim 1, wherein the cover plate of the plastic body is at least one of transparent and semi-transparent to light emitted from the electrical function module.

10. The interior trim part according to claim 9, wherein the cover plate is transparent to light emitted from the electrical function module.

11. The interior trim part according to claim 1, wherein the electrical function module comprises at least one of an illumination device and a display device.

12. The interior trim part according to claim 1, wherein the electrical function module comprises at least one of a control device, a switch, a transmitter and a receiver.

13. The interior trim part according to claim 1, wherein, in the cover plate of the plastic body, the top side of the plastic body adjoins the plastic skin.

14. The interior trim part according to claim 1, further comprising:
a support component; and
wherein the plastic body is provided as an insert;
wherein the support component has an opening which is covered by the plastic skin;
wherein the insert is received in the opening; and
wherein the insert receives the electrical function module.

15. An interior trim part for a motor vehicle, comprising:
a cover comprising a decorative layer;
wherein the decorative layer is a plastic skin;
a plastic body comprising a top side, a back side and a cover plate;
wherein a foam is disposed between the plastic skin and the plastic body, including the cover plate;
an electrical function module equipped to emit and receive light through the cover plate of the plastic body, the foam and the plastic skin;
wherein the electrical function module comprises a proximity sensor and/or a motion sensor, which is activated by approaching the proximity sensor and/or the motion sensor, or which is activated by a swiping motion over the proximity sensor and/or the motion sensor;
wherein, in the cover plate of the plastic body, the electrical function module including the proximity sensor and/or the motion sensor underlies the cover plate of the plastic body and the electrical function module is disposed adjacent the back side of the plastic body; and
wherein the plastic skin, the foam, and the cover plate of the plastic body are light transmissive to light emitted from the electrical function module.

16. An interior trim part for a motor vehicle, comprising:
a cover comprising a decorative layer;
wherein the decorative layer is a plastic skin, wherein the plastic skin is formed of at least one of PVC, PU, TPU, TPE and TPO;
a plastic body comprising a top side, a back side and a cover plate;
wherein the top side of the plastic body at the cover plate underlies the plastic skin and is disposed adjacent the plastic skin;
an electrical function module equipped to emit and receive light through the cover plate of the plastic body and the plastic skin;
wherein the electrical function module comprises a proximity sensor and/or a motion sensor, which is activated by approaching the proximity sensor and/or the motion sensor, or which is activated by a swiping motion over the proximity sensor and/or the motion sensor;
wherein the electrical function module including the proximity sensor and/or the motion sensor underlies the cover plate of the plastic body and the electrical function module is disposed adjacent the back side of the plastic body; and
wherein the plastic skin and the cover plate of the plastic body are light transmissive to light emitted from the electrical function module.

* * * * *